United States Patent
Chafer et al.

(10) Patent No.: US 10,235,139 B2
(45) Date of Patent: Mar. 19, 2019

(54) METHOD FOR MODIFYING THE EXECUTION OF A PLATFORM-INDEPENDENT METHOD OF AN INTEGRATED CIRCUIT CARD

(71) Applicant: GEMALTO SA, Meudon (FR)

(72) Inventors: Sylvain Chafer, Meudon (FR); Stephane Durand, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/567,238

(22) PCT Filed: Apr. 18, 2016

(86) PCT No.: PCT/EP2016/058480
§ 371 (c)(1),
(2) Date: Oct. 17, 2017

(87) PCT Pub. No.: WO2016/166359
PCT Pub. Date: Oct. 20, 2016

(65) Prior Publication Data
US 2018/0107475 A1    Apr. 19, 2018

(30) Foreign Application Priority Data
Apr. 17, 2015    (EP) .................................... 15305577

(51) Int. Cl.
*G06F 9/45*          (2006.01)
*G06F 8/20*          (2018.01)
(Continued)

(52) U.S. Cl.
CPC .............. *G06F 8/24* (2013.01); *G06F 8/4441* (2013.01); *G06F 8/656* (2018.02);
(Continued)

(58) Field of Classification Search
CPC ..... H04L 67/10; H04L 63/083; G06Q 20/341; G06Q 20/367; G06F 8/24
See application file for complete search history.

(56) References Cited

U.S. PATENT DOCUMENTS 6,202,208 B1    3/2001    Holiday, Jr.
8,807,440 B1 *  8/2014    von Behren ......... G06Q 20/367
                                                235/492
(Continued)

FOREIGN PATENT DOCUMENTS

WO    WO0190885 A2    11/2001

OTHER PUBLICATIONS

PCT/EP2016/058480, International Search Report, dated Jul. 1, 2016, European Patent Office, P.B. 5818 Patentlaan 2 NL-2280 HV Rijswijk.
(Continued)

*Primary Examiner* — Tuan A Vu
(74) *Attorney, Agent, or Firm* — The Jansson Firm; Pehr B. Jansson

(57) ABSTRACT

Modification of the execution of a platform-independent first method of an application within an integrated circuit card having a first non-volatile memory, a second rewritable non-volatile memory, a virtual machine and a processor unit, wherein said platform-independent first method includes a first operations sequence and a second operations sequence. Checking if there is a call within said platform-independent first method to a specific second method, having one parameter; —if there is such a call and if said specific second method is not platform-independent, checking if there is an alternate function associated to said platform-independent first method stored in a memory of said integrated circuit card; if there is an associated alternate function: executing said alternate function to replace said first operations sequence; executing the second operations sequence of said
(Continued)

platform-independent first method; otherwise executing by the first operations sequence and the second operations sequence of said platform-independent first method.

15 Claims, 3 Drawing Sheets

(51) Int. Cl.
    *G06F 9/448*     (2018.01)
    *G06F 9/445*     (2018.01)
    *G06F 9/455*     (2018.01)
    *G06F 8/656*     (2018.01)
    *G06F 8/41*     (2018.01)
    *G06F 9/30*     (2018.01)
    *G06F 9/32*     (2018.01)
    *H04L 29/08*     (2006.01)

(52) U.S. Cl.
    CPC .......... *G06F 9/30181* (2013.01); *G06F 9/328* (2013.01); *G06F 9/4484* (2018.02); *G06F 9/44536* (2013.01); *G06F 9/45516* (2013.01); *H04L 67/10* (2013.01)

(56) References Cited

U.S. PATENT DOCUMENTS

| | | | |
|---|---|---|---|
| 9,479,496 B2* | 10/2016 | Semba | H04L 63/083 |
| 2005/0076212 A1* | 4/2005 | Mishina | G06Q 20/341 |
| | | | 713/168 |
| 2005/0228959 A1 | 10/2005 | D Albore et al. | |
| 2007/0136819 A1 | 6/2007 | Lagergren | |
| 2013/0205415 A1* | 8/2013 | McKee | G06F 8/24 |
| | | | 726/30 |
| 2014/0053234 A1* | 2/2014 | Barton | H04L 67/10 |
| | | | 726/1 |

OTHER PUBLICATIONS

PCT/EP2016/058480, Written Opinion of the International Searching Authority, dated Jul. 1, 2016, European Patent Office, D-80298 Munich.

* cited by examiner

METHOD FOR MODIFYING THE EXECUTION OF A PLATFORM-INDEPENDENT METHOD OF AN INTEGRATED CIRCUIT CARD

TECHNICAL FIELD

The present invention relates to a method for modifying the execution of a platform-independent first method of an application within an integrated circuit card, said integrated circuit card comprising a first non-volatile memory, a second rewritable non-volatile memory, a virtual machine and a processor unit.

The invention also relates to an associated integrated circuit card.

Such a method may be used in a non-limitative example for payment applications.

BACKGROUND OF THE INVENTION

Application developers are facing more and more challenges as during the whole life of the application, they have to make their application easily customizable and efficient enough in term of performance to meet fast changing market demands.

The source code related to an application comprises at least one platform-independent first method corresponding to a plurality of operations sequences of the application to be performed. A platform-independent first method is written in a language which is a platform-independent code, which, after compilation, is interpreted and executed by a virtual machine of said integrated circuit card. The platform-independent code is independent from the processor unit of the integrated circuit card so that it may be executed in the same way on any integrated circuit card issued by any provider.

When said application has been already loaded in the integrated circuit card, in order to customize the application or to improve the running time of some critical parts of the application, one solution well-known by the man skilled in the art is to propose to modify the execution of a platform-independent method through a mechanism called class extension, which requires splitting the code of the platform-independent method into small methods and download them in the integrated circuit card to replace the operations sequence(s) to be customized or optimized.

A problem of this prior art is that the multiple invocations of all the small methods slow down the application performance.

SUMMARY OF THE INVENTION

It is an object of the invention to provide a method for modifying the execution of a platform-independent first method by means of a virtual machine of an integrated circuit card, said integrated circuit card comprising a first non-volatile memory, a second rewritable non-volatile memory and a processor unit, which permits to customize and/or optimize said platform-independent method while keeping the interoperability of said platform-independent first method and without slowing down the application performance.

To this end, there is provided a method for modifying the execution of a platform-independent first method of an application within an integrated circuit card, said integrated circuit card comprising a first non-volatile memory, a second rewritable non-volatile memory, a virtual machine and a processor unit, wherein said platform-independent first method comprises a first operations sequence and a second operations sequence, and wherein said method comprises:
- checking by means of said virtual machine if there is a call within said platform-independent first method to a specific second method, said specific second method, stored in a memory of said integrated circuit card, comprises one parameter;
- if there is such a call, said processor unit or said virtual machine executes said specific second method;
- said processor unit or said virtual machine checking if there is an alternate function associated to said platform-independent first method, said alternate function being stored in a memory of said integrated circuit card; said processor unit or said virtual machine using said parameter to locate the alternate function within said integrated circuit card memory;
- if there is an associated alternate function:
- executing by means of said processor unit or by means of said virtual machine said alternate function, said alternate function replacing said first operations sequence;
- upon completion of said alternate function, skipping said first operations sequence and executing by means of said virtual machine the second operations sequence of said platform-independent first method.

As we will see in further details, if the integrated circuit card on which the platform-independent first method executed is equipped with an alternate function (identified by said parameter) for a first operations sequence of said first platform-independent method, the call to said function (via the specific second method) will jump to the implementation of this alternate function and upon return of this alternate implementation, skip the original implementation of the a first operations sequence.

If the integrated circuit card does not support such an alternate function, or if no alternate function has been associated with the parameter, the call to the second method will do nothing, so that the original implementation of the a first operation sequences will be executed normally.

According to non-limitative embodiments of the invention, the optimization method in accordance with the invention further comprises the following characteristics.

In a non-limitative embodiment, the checking of the alternate function is not performed if said specific second method is a platform-independent.

In a non-limitative embodiment, said platform-independent first method comprises at least one argument and said method further comprises:
- if there is an associated alternate function, recovering by means of said virtual machine said at least one argument of said platform-independent first method for use and modification by said alternate function.

In a non-limitative embodiment, said platform-independent first method comprises at least one local variable and said method further comprises:
- if there is an associated alternate function, recovering by means of said virtual machine said at least one local variable of said platform-independent first method for use and modification by said alternate function.

In a non-limitative embodiment, said alternate function is a platform-independent function or a native function.

In a non-limitative embodiment, said specific second method is a platform-independent method or a native method or is a set of specific instructions of said virtual machine.

In a non-limitative embodiment, said specific second method is comprised in a first package, said platform-independent first method is comprised in a second package, and said alternate function is comprised in a third package, all the three packages being different from each other.

In a non-limitative embodiment, said alternate function is stored in said first non-volatile memory or in said second rewritable non-volatile memory.

In a non-limitative embodiment, said specific second method returns a Boolean type, and:
- upon completion of said alternate function, said specific second method returns a false value;
- when there is no alternate function associated to said platform-independent first method corresponding to said parameter, said specific second method returns a true value;
- when said specific second method is platform-independent, said specific second method returns a true value.

In a non-limitative embodiment, said second non-volatile memory comprises at least one table, said at least one table comprising an associated reference of said alternate function indicating where said alternate function associated to said platform-independent first method is stored in memory within said integrated circuit card.

In a non-limitative embodiment, said virtual machine is a Java™ virtual machine.

In a non-limitative embodiment, said integrated circuit card is a secure element.

In a non-limitative embodiment, said second rewritable non-volatile memory is different from said first non-volatile memory.

In a non-limitative embodiment, said method further comprises downloading said alternate function in a memory of said integrated circuit card, said download comprising:
- a first information to identify said application where the platform-independent first method is defined;
- a second information to associate a parameter to a reference corresponding to the alternate function;
- a third information comprising the implementation of said alternate function as a replacing operations sequence for said first operations sequence.

In addition, there is provided an integrated circuit card comprising a virtual machine, a processor unit, a first non-volatile memory and a second rewritable non-volatile memory, wherein said integrated circuit card is adapted to modify the execution of a platform-independent first method of an application within said integrated circuit card, said platform-independent first method comprises a first operations sequence and a second operations sequence, and wherein:
- said virtual machine is adapted to check if there is a call within said first platform-independent method to a specific second method, said specific second method comprising one parameter;
- if there is such a call, said processor unit or said virtual machine is adapted to check according to said parameter if there is an alternate function associated to said platform-independent first method stored in a memory of said integrated circuit card;
- if there is an associated alternate function:
- said processor unit or said virtual machine is adapted to execute said alternate function, said alternate function replacing said first operations sequence;
- upon completion of said alternate function, said virtual machine is further adapted to execute the second operations sequence of said first platform-independent method;
- otherwise, said virtual machine is further adapted to execute the first operations sequence and the second operations sequence of said first platform-independent method.

In a non-limitative embodiment, said processor unit is adapted to not perform the checking of if there is an alternate function when said specific second method is a platform-independent.

In a non-limitative embodiment, said integrated circuit card comprises:
- a first package comprising said second specific method;
- a second package comprising said first platform-independent method; and
- a third package comprising said alternate function, said first, second and third packages being different from each other.

In addition, there is provided a computer program product comprising a set of instructions, which when loaded into an integrated circuit card, causes the integrated circuit card to carry out the method according to any one of the previous characteristics.

BRIEF DESCRIPTION OF THE FIGURES

Some embodiments of methods and/or apparatus in accordance with embodiments of the present invention are now described, by way of example only, and with reference to the accompanying drawings, in which.

DESCRIPTION OF EMBODIMENTS OF THE INVENTION

Figure 1:
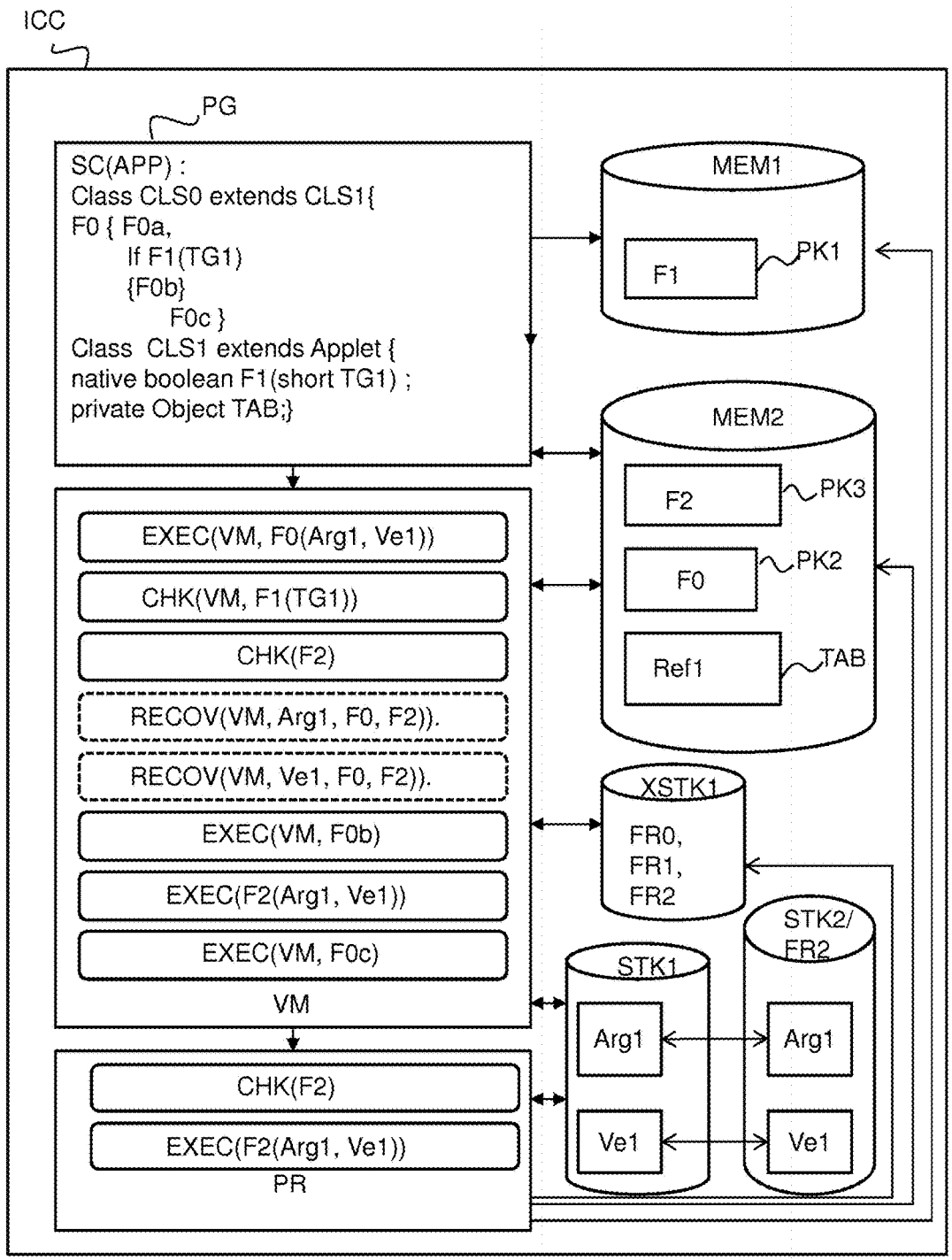
FIG. 1 illustrates schematically a first non-limitative embodiment of an integrated circuit card which carries out the method of the invention, and which supports an alternate function.

In the following description, well-known functions or constructions by the man skilled in the art are not described in detail since they would obscure the invention in unnecessary detail.

The present invention relates to a method MTH for modifying the execution of a platform-independent first method F0 by a virtual machine VM of an integrated circuit card ICC.

As we will see the method provides the ability to customize or optimize the performance of parts of a platform-independent method through alternate function(s), while keeping the application (implemented partly or fully by said platform-independent method) interoperable, and loadable, even at post-issuance, on any platform, here on any integrated circuit card ICC which includes a virtual machine.

In the following description:
- application APP refers to a set of one or more programs designed to carry out a set of operations sequences to perform specific tasks. An application APP comprises at least one applet;
- platform refers to the integrated circuit card ICC comprising at least an operating system and a virtual machine.
- applet refers to a program which is written in a source code and delivered to users in the form of virtual machine instructions. An applet can be loaded in the integrated circuit card ICC after it has been manufactured, during the lifetime of said integrated circuit card ICC. An applet comprises at least one platform-independent method.

source code refers to programming code that is a platform-independent code. The source code is interoperable as it may be run without being modified on any kind of devices such as an integrated circuit card ICC which supports a virtual machine VM. It is written in a portable language and run by a virtual machine. Once compiled, the source code generates virtual machine instructions;

virtual machine instructions refers to programming code that is run through a virtual machine instead of a specific processor unit, such as the processor unit of the integrated circuit card ICC. Such programming code is a platform-independent code. Said virtual machine instructions are issued from the compilation of source code. Virtual machine instructions invoke native functions when they need to use the resources of the platform, here of the integrated circuit card ICC;

a native function refers to programming code which when compiled generates a native code;

native code (also called machine language) refers to programming code that is configured to run on a specific processor unit. Native code will generally not run if used on a processor unit other than the one it was specifically written for. It is a platform-dependant code. In the example of the integrated circuit card ICC, a native code is linked to the processor unit of said integrated circuit card;

a virtual machine VM is an interpreter which decodes and executes virtual machine instructions;

a native method is a method which is declared as native in the source code and which invokes a native function. A native method is platform-dependent;

an operation (also called functionality) refers to a functional process;

an instruction refers to an elementary operation executed by the virtual machine or the processor unit;

in a non-limitative embodiment, a package permits to group platform-independent methods together, which are all related. In the example taken, the methods all have to do with the payment transaction. Moreover, packages may be stored in structured containers (called cap files in the example of JavaCard™ packages), allowing to download the methods as a functionally consistent group.

In non-limitative examples:

the virtual machine is a Java™ virtual machine JVM and the portable language is the Java™ language dedicated to an integrated circuit card ICC card, which is called JavaCard™' the source code is written in JavaCard™. The virtual machine instructions are of the form of bytecodes. They include one or a plurality of bytes. In an integrated circuit card ICC, the bytecodes are stored in a file called cap file.

a native function is written in the C language.

These non-limitative examples will be taken in the following description.

The integrated circuit card ICC which carries out the method MTH is described in the following with reference to FIG. 1.

In the description, the integrated circuit card ICC is also called ICC card.

In a non-limitative embodiment, the integrated circuit card ICC is a secure element.

A secure element is a secured component which comprises a secured chip and may perform cryptographic functionalities and is adapted to store secret information.

In non-limitative variants, the secure element is a smart card, a soldered element etc. In a non-limitative example, the secure element is a banking card, such as an EMV card.

As illustrated in FIG. 1, the ICC card comprises:
- a virtual machine VM;
- a processor unit PR. A processor unit PR comprises one or a plurality of processors.
- a first non-volatile memory MEM1;
- a second rewritable non-volatile memory MEM2.

In a non-limitative embodiment, the first memory MEM1 is different from the second memory MEM2. In a non-limitative example, the first non-volatile memory MEM1 is a ROM ("Read Only Memory"), and the second rewritable non-volatile memory MEM2 is a memory such as an EEPROM ("Electrically-Erasable Programmable Read-Only Memory»), a FLASH memory, etc.

The ICC card comprises a source code SC written in JavaCard™. This source code refers to an application APP of a payment application in a non-limitative example.

In a non-limitative embodiment, the bytecodes corresponding to the source code SC are stored in the second memory MEM2.

It is to be noted that in payment applications, the performance of payment transactions need to be optimal as there is a limit amount of time for a payment transaction to be executed according to payment standards, such as for example, banking EMV ("Europay Mastercard Visa") standards.

The time execution of an application is an important issue especially when using the integrated circuit card in contactless products.

The source code SC comprises one or a plurality of platform-independent methods which refer to the different operations necessary to set-up the payment transaction between the ICC card and a payment terminal in a contact or contactless way in a non-limitative example.

A platform-independent method is written in a language which is a platform-independent code, which, after compilation, is interpreted and executed by a virtual machine of said integrated circuit card. The platform-independent code is independent from the processor unit of the integrated circuit card so that it may be executed in the same way on any integrated circuit card issued by any provider.

Some of the platform-independent methods which are critical, especially in terms of time in the case of a payment application, have to be optimized. Some of the platform-independent methods need to be updated so that they run in a new manner.

These methods are called first platform-independent methods F0.

Said platform-independent methods F0 are in the form of bytecodes when executed by said virtual machine VM.

A platform-independent first method F0, which is written in JavaCard™ in the non-limitative example given, is defined and implemented in a first class CLS0. Said class is an applet.

It is to be noted that said applet is downloaded in the ICC card either during the personalization phase of the ICC card, or after post-issuance.

The platform-independent first method F0 comprises:
- a first operations sequence F0*b* to be optimized and/or customized;

a second operations sequence F0c which is to be performed after the first operations sequence F0b.

It is to be noted that an operation sequence comprises one or a plurality of operations.

In a non-limitative embodiment, the second operations sequence F0c comprises at least a return operation to exit from said platform-independent first method F0.

In a non-limitative embodiment, the platform-independent first method F0 comprises a third operations sequence F0a which is to be performed before the first operations sequence F0b and the second operations sequence F0c.

The platform-independent first method F0 comprises a call (also called an invocation) to a specific second method F1, said specific second method F1 comprising one parameter TG1.

It is to be noted that several calls to different specific second methods F1 may occurred in the same platform-independent first method F0.

In the non-limitative given example, the call F1 within said platform-independent first method F0 to said specific second method is performed:
  before said a first operations sequence F0b and said second operations sequence F0c; and
  after said third operations sequence F0a.

In a non-limitative embodiment, the specific second method F1 is declared as a static method in said source code SC. The static declaration permits the second method F1 to be available for all the first platform-independent methods F0 invoking said second method F1 without having any creation of an instance of said second method F1 at each invocation. The time execution of a platform-independent first method F0 calling said second method F1 is therefore improved. There is no need for each platform-independent first method F0 to have a specific reference to said second method F1.

The specific second method F1 comprises at least one parameter TG1 which is a specific argument. In a non-limitative example, the parameter TG1 is a short integer. It permits to locate an alternate function F2.

In a non-limitative embodiment, said parameter TG1 is an index. In a non-limitative variant, said index is adapted to be continuously incremented according to the different first operations sequences F0b of same or different first platform-independent methods F0 identified to be optimized and/or customized.

It permits to access the table TAB (described hereinafter) by said index TG1. Said index is incremented from zero in a non-limitative example.

In a non-limitative embodiment, the second memory MEM2 also comprises at least one table TAB, said table TAB comprising at least one associated reference Ref1 of an alternate function F2 indicating where said alternate function F2 associated to said platform-independent first method F0 is stored in memory within said integrated circuit card ICC.

It is to be noted that this at least one table TAB is defined by the party which develops the alternate function(s) F2. Said table TAB is loaded in the second memory MEM2 at the same time than the alternate function(s) F2.

Said party will usually be an ICC card issuer.

In a non-limitative embodiment, the specific second method F1 returns a Boolean type. It permits to the virtual machine VM to decide if the original implementation of the operations sequence is to be skipped or to be executed.

Hence, as will be later explained, when the specific second method F1 resolves the parameter TG1 and locates a valid alternate implementation (i.e. an alternate function F2) for the original operations sequence F0b, upon return to this alternate implementation, it returns a false value so that the original operations sequence F0b is not executed. The alternate implementation F2 is executed and all the arguments and local variables of said specific second method F1 are available for said alternate implementation F2.

Figure 2:
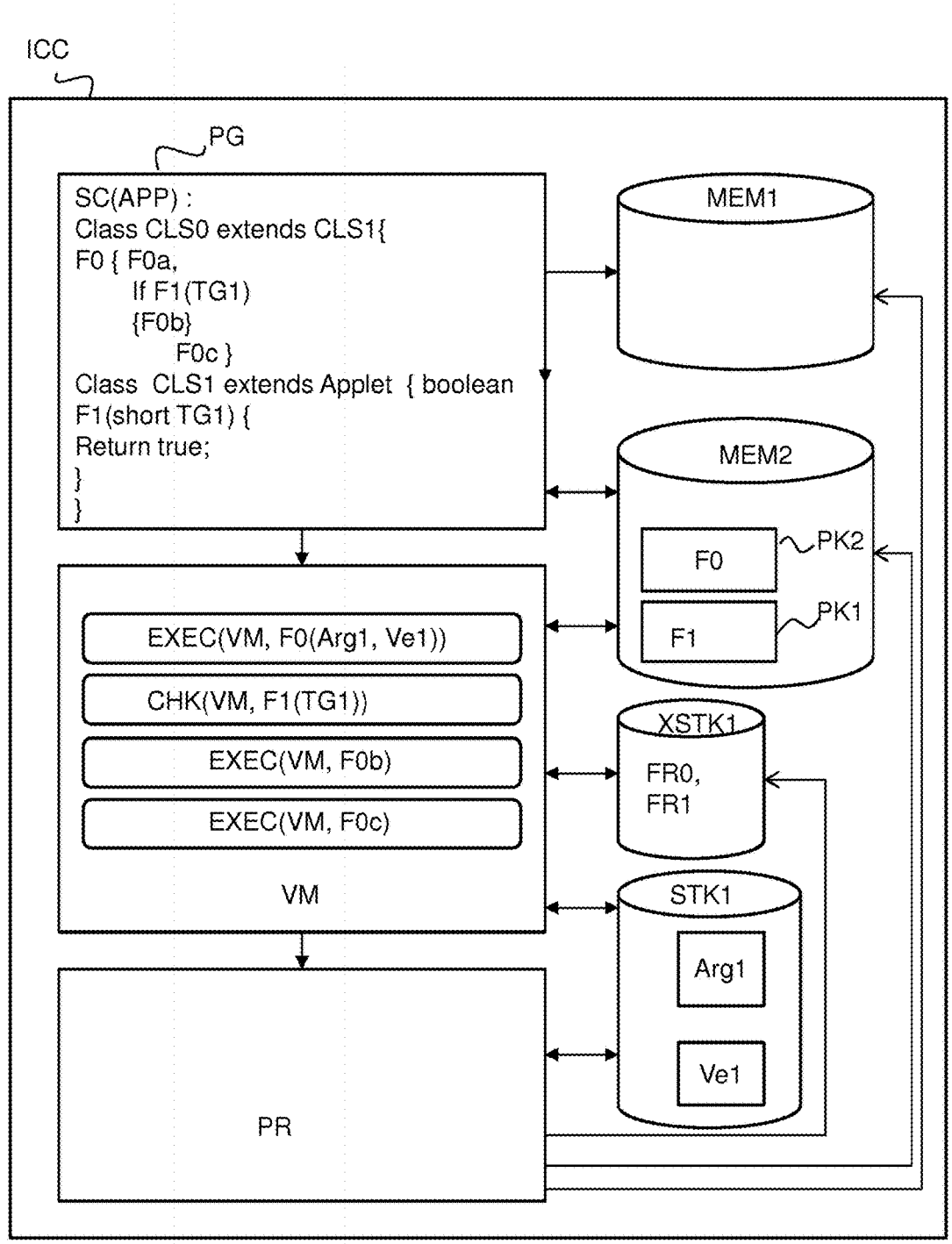
FIG. 2 illustrates schematically a second non-limitative embodiment of an integrated circuit card which carry out the method of the invention, and which doesn't support an alternate function.

Conversely, if no alternate implementation is found or if the platform doesn't support an alternate function F2, the specific second method F1 returns a true value and the original operations sequence F0b is executed normally. It is to be noted that the FIG. 2 illustrated an ICC card which comprises a virtual machine VM which won't interpret the parameter TG1 of the specific second method F1. Said ICC card is called a generic platform. As it is described below, according to the type of the targeted platform, the specific second method F1 is implemented differently and in a non-limitative embodiment defined differently (native, proprietary bytecodes, or platform-independent).

In a first non-limitative embodiment, said specific second method F1 is a platform-independent method. It is written in JavaCard™ and is stored in said second non-volatile memory MEM2.

In a second non-limitative embodiment, said specific second method F1 is a native method. It is written in the C language and is stored in said first non-volatile memory MEM1. It permits to have access to the virtual machine data stack STK1 and execution stack XSTK1 and to modify the creation of new frames (which are also called execution stack frames).

In a third non-limitative embodiment, the specific second method F1 is a set of specific instructions of said virtual machine VM. It means that it is a proprietary bytecodes and is stored in said first non-volatile memory MEM1. It permits to replace the virtual machine instructions of the native method by a proprietary bytecodes and therefore to reduce the number of virtual machine instructions used for example. The timing performance may therefore be enhanced.

Depending on the targeted platform, different implementations of the specific second method F1 may be provided as following.

For a platform also called generic platform (illustrated in FIG. 2) which is not aware of the possibility to modify the execution of said platform-independent first method F0, in a non-limitative embodiment, said specific second method F1 is implemented as a platform-independent method with a parameter TG1 and always returning true regardless of the value of said parameter TG1. In this case, any value of the parameter TG1 may be defined. To this end, in a non-limitative embodiment, a second class CLS1 is defined, which comprises a specific second method F1 with a Boolean return type, a parameter TG1 as an argument, and the "return true" operation.

For a platform (illustrated in FIG. 1) which is aware of the possibility to modify the execution of said platform-independent first method F0, in a non-limitative embodiment, the two last definitions of F1 (native or proprietary bytecodes) may be used.

To this end, in a non-limitative embodiment, a second class CLS1 is defined, which comprises:
  an object declaration of the table TAB;
  a specific second method F1 with a Boolean return type and a parameter TG1 as an argument.

It is to be noted that the first class CLS0 extends the second class CLS1 so that the specific second method F1 is visible and can be invoked from all methods defined in CLS0.

Furthermore, it is to be noted that the second class CLS1 extends the class named Applet class which is the base superclass for all applets residing on an integrated circuit card ICC comprising a JVM.

It is to be noted that this specific second method F1 is named by the party which develops the optimization method. Usually, it will be an ICC card issuer.

In a non-limitative embodiment, the integrated circuit card ICC comprises:
- a first package PK1 including said specific second method F1;
- a second package PK2 including at least one platform-independent first method F0;
- a third package PK3 which comprises said alternate function F2.

The second package PK2 comprises the source code SC related to the application APP, said source code SC comprising the at least one platform-independent first method F0. In the non-limitative implementation described, the second package PK2 comprises the first class CLS0. As above-described, in a non-limitative embodiment the second package PK2 is stored in said second memory MEM2

It is to be noted that there is a first package PK1 when the specific second method F1 is a platform-independent method or a native method. In this case, in the non-limitative implementation described, the first package PK1 comprises the second class CLS1. When the specific second method F1 is a proprietary bytecodes, of course, there is no first package PK1. As above-described, in a non-limitative embodiment the first package PK1 is stored in said second memory MEM2 or in said first memory MEM1.

The two packages PK1 and PK2 are different so that the first package PK1 may be installed without any modification on any platform (one which doesn't support the alternate function F2 (FIG. 2), or one which supports it (FIG. 1)).

In a non-limitative embodiment, said second package PK2 is stored in said second memory MEM2 or in said first memory MEM1.

Said third package PK3 is different from the first PK1 and second packages PK2 so that the first package PK1 is generic for all the different platforms and the third package PK3 may be created and loaded when updates (customization and/or optimization) are needed.

Hence, all the packages PK1, PK2 and PK are different from each other.

In a first non-limitative variant, the implementation of the alternate function F2 is written in the class CLS0 of the platform-independent first method F0 so that it has access to the other objects of said class. It is to be noted that in this case, the second package PK2 is created after the compilation of the class in the form of bytecodes. The bytecodes corresponding to said alternate function F2 is extracting and put in the second package PK2.

In a second non-limitative variant, the implementation of the alternate function F2 is written outside said class CLS0.

It is to be noted that the second package PK2 including the platform-independent first method F0 is loaded by a party which will usually be the authority which will dispatch the ICC card to the end-user, such as a bank in a non-limitative example. Therefore the second package PK2 is usually loaded in the second memory MEM2 not at the same moment than the alternate function(s) F2.

In a first non-limitative embodiment, said alternate function F2 is a platform-independent function. In this case, said alternate function F2 is written in JavaCard™' and comprises operations which are arranged so as to optimize and/or customize an operations sequence of the associated platform-independent first method F0 of the application APP.

In a second non-limitative embodiment, said alternate function F2 is a native function. In this case, said native function F2 is written in the C language in a non-limitative given example, and comprises instructions which are arranged so as to optimize and/or customize an operations sequence of the associated platform-independent first method F0 of the application APP.

In a non-limitative embodiment, said alternate function F2 is stored in said first non-volatile memory MEM1 or in said second rewritable non-volatile memory MEM2.

The execution of said alternate function F2 is faster within the first non-volatile memory MEM1 is a non-rewritable memory such as a ROM, than within the second rewritable non-volatile memory MEM2. It is to be noted that the use of a first non-volatile memory MEM1 is a non-rewritable memory such as a ROM is also less expensive than the use of a second rewritable non-volatile memory MEM2.

As will be described, the alternate function F2 will be called via said the specific second method F1 so that said function F2 will be executed instead of some of the virtual machine instructions of the platform-independent first method F0 and the targeted operation(s) of said platform-independent first method F0 optimized or modified. After the execution of said function F2, the second operations sequence F0c is executed and then there is a usual exit from said platform-independent first method F0 (thanks to the last operation of F0c, which is a return-from-call operation).

Figure 3:
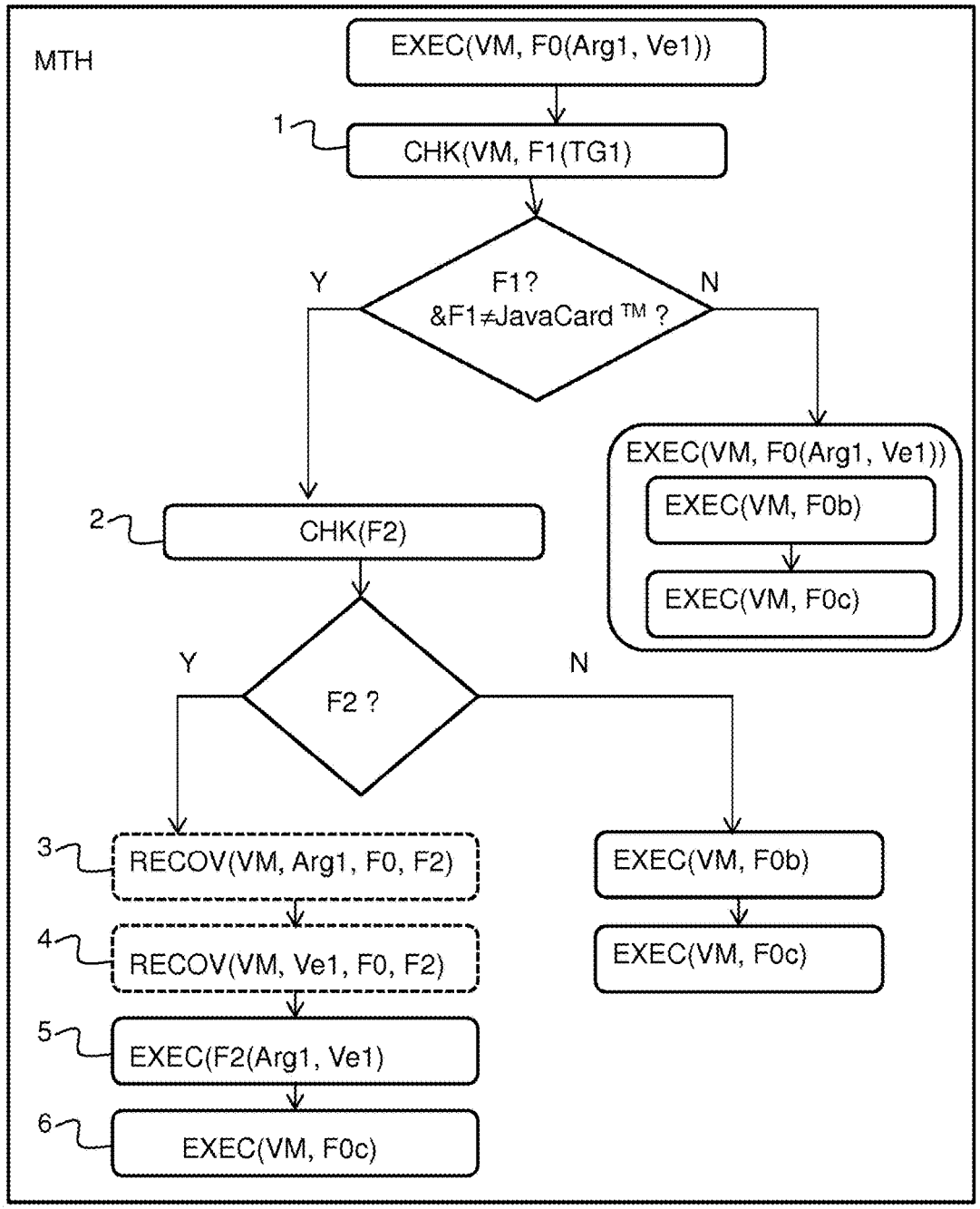
FIG. 3 is a schematic organization chart of the method according to a non-limitative embodiment of the invention.

Said method MTH is illustrated in FIG. 3 in a non-limitative embodiment.

In the non-limitative example illustrated:
- the platform-independent first method F0 has at least one argument Arg1 and comprises at least one local variable Ve1.
- the platform-independent first method F0 further comprises a third operations sequence F0a.
- the call within said platform-independent first method F0 to said specific second method F1 is further performed after said third operations sequence F0a;
- the checking of an alternate function F2 is performed if the specific second method F1 is not a platform-independent method (that means when it is native or a proprietary bytecodes).

It is to be noted that said platform-independent first method F0 may return data of may return no data. As the return of data is performed as usual when executing a method, it won't be described here.

As we will see, the method provides an easy and efficient way to replace (i.e. patch) parts of application implementation by alternate platform-independent code or native code, while keeping initial implementation interoperable and with very limited impact on application's design. The method may be used for addressing both customization and optimization objectives.

It is to be noted that after the source code SC comprising the platform-independent first method F0 has been compiled, the virtual machine instructions are generated and the resulting cap file is loaded in the second memory MEM2, in the non-limitative given example. Then, the virtual machine VM executes the bytecodes of said platform-independent first method F0 as following.

It is to be reminded that the call to the specific second method F1 is performed in the platform-independent first method F0 before any operations of said platform-independent first method F0 which are to be optimized and/or customized, so that the dedicated virtual machine VM will look for and run the corresponding alternate function F2 instead of said operations. Of course, the virtual machine VM executes as usual in said platform-independent first method F0 the operations sequence F0a written before the call of the specific second method F1 (said execution is not illustrated in FIG. 3), and the operations sequence F0c written after the call of the specific second method F1.

The different steps of the method MTH are described in detailed hereinafter.

In step 1), the virtual machine VM checks if there is a call within said platform-independent first method F0 to a specific second method F1, said specific second method F1 comprising one parameter TG1 (step illustrated CHK(VM, F1(TG1)).

In a non-limitative example, the checking is performed with the name of the specific second method F1. Hence, the specific second method F1 is recognized with its name.

If there is a call and if said specific second method F1 is a platform-independent, the virtual machine VM executes the specific second method F1. As will be described below, the first operation sequences F0b is replaced by the alternate function F2 during the execution of said specific second method F1.

It is to be noted that if there is no call to a specific second method F1 (first branch N illustrated in FIG. 3), the virtual machine VM runs the virtual machine instructions of said platform-independent first method F0, that is to say, in the example of the java virtual machine, it executes (illustrated EXEC(VM, F0(Arg1, Ve1)) the original JavaCard™ implementation which is slower to be executed or not customized.

It is to be noted that the virtual machine VM which is dedicated to take into account the specific second method F1, that is to say which is aware that there may be an alternate function F2 associated to the platform-independent first method F0 to be run instead of the virtual machine instructions of the first operation sequence F0b, will perform step 1) at runtime (during the execution of the platform-independent first method F0) described hereinafter.

If the virtual machine VM is not aware that there may be an alternate function F2 to be run instead of the virtual machine instructions of the first operation sequence F0b of the platform-independent first method F0, it will run the second method F1, but as this specific second method F1 will return a true value in this case, the virtual machine VM will go on executing the virtual machine instructions of the first original operation sequence F0b.

In step 2), if there is such a call and if said specific second method F1 is not platform-independent (first branch N illustrated in FIG. 3), said processor unit PR checks according to said parameter TG1 if there is an alternate function F2 associated to said platform-independent first method F0 stored in a memory MEM1, MEM2 of said integrated circuit card ICC (step illustrated CHK(F2)).

It is to be reminded that said specific second method F1 is not platform-independent (i.e. is different from a platform-independent method in other words it is not an interoperable method) when it is either a native method or a proprietary bytecodes.

The alternate function F2 offers a different implementation of some operations of the platform-independent first method F0.

It is to be reminded that the final operation of the platform-independent first method F0 is a return from-call operation.

The parameter TG1 acts as a reference to the alternate function F2 corresponding to the parts F0b of the platform-independent first method F0 which are optimized and/or customized.

In a non-limitative embodiment, the virtual machine VM or the processor unit PR uses the table TAB above-described to locate in the ICC card the alternate function F2 associated to the platform-independent first method F0.

The parameter TG1 acts as a table index. The table TAB references a table of references Ref1 ordered by said index.

In a non-limitative embodiment, there are up to as many parameter TG1 values as there are different parts F0b of same or different first platform-independent methods F0 identified to be optimized and/or customized.

In a non-limitative variant of the non-limitative embodiment, one or a plurality of same values of a parameter TG1 are each associated with a plurality of first operations sequences F0b of same or different first platform-independent methods F0.

It is noted that in such non-limitative variant of the non-limitative embodiment, the present step 2 will evaluate identically for all the first operations sequences F0b of same or different first platform-independent methods F0 associated with the same value of a parameter TG1.

That means two different parameters TG1 may refer to the same alternate function F2.

In a first non-limitative example, two different first operations sequences F0b of the same platform-independent first method F0 (or of at least two different first platform-independent methods F0) may have two different associated parameters TG1 and the same alternate function F2 is associated with said two parameters TG1. In this case, the two different first operations sequences F0b may be updated at different times.

In a second non-limitative example, two different first operations sequences F0b of the same platform-independent first method F0 (or of at least two first platform-independent methods F0) may have the same associated parameter TG1 and the same alternate function F2 is associated with said parameter TG1. In this case, the two different first operations sequences F0b may be updated at the same time.

The table TAB comprises as many references Ref1 as there are different values of parameter TG1 associated to different parts F0b of different first platform-independent methods F0 to be optimized and/or customized.

Therefore, according to the value of a parameter TG1, the virtual machine VM or the processor unit PR finds the associated reference Ref1 of said alternate function F2. Said reference Ref1 is an address pointer (when the alternate function F2 is native) or a reference pointer (when the alternate function F2 is platform-independent).

If the reference Ref1 is valid (in a non-limitative example non equal to zero), the right alternate function F2 associated to the platform-independent first method F0 which is currently executed, is retrieved.

Said alternate function F2 comprises an operations sequence which will replace (i.e. be executed instead of) the operations sequence F0b of said platform-independent first method F0, either to customize the operations sequence F0b and/or to optimize the operations sequence F0b.

It is to be noted that for each application APP, there will be an associated table TAB, as according to an application APP, there will be different first platform-independent methods F0, and according to an application APP, different first platform-independent methods F0 are to be optimized and/or customized.

Therefore, the second non-volatile memory MEM2 comprises one or a plurality of tables TAB, each associated to one source code C corresponding to an application APP.

Therefore a parameter TG1 may have the same value in different tables TAB, but the same value may refer to different alternate functions F2.

It is to be noted that if there is no alternate function F2 which is associated to the platform-independent first method F0, it means that there is no function F2 which corresponds to the value of the parameter TG1. It means that the reference Ref1 in the table TAB corresponding to the value of the parameter TG1 is null (when the parameter TG1 is an index as in the illustrated example). In another non-limitative example, it means that there is no reference Ref1 (when the parameter TG1 is not an index).

In this case, the specific second method F1 returns a true value.

Upon reception of said true value, the virtual machine VM knows that the original operations sequence F0b is to be executed.

Therefore (second branch N illustrated in FIG. 3), the virtual machine VM executes the original JavaCard™ implementation, that is to say, it executes:
- the operations sequence F0b of said platform-independent first method F0 following the call to said specific second platform-independent method F1 (illustrated EXEC(VM, F0b));
- the operations sequence F0c of said platform-independent first method F0 following the call to said specific second platform-independent method F1 (illustrated EXEC(VM, F0c)).

In the same manner, when said specific second method F1 is not native or a proprietary bytecodes, i.e. is platform-independent, said specific second method F1 returns a true value. Therefore, the virtual machine VM knows that the original operations sequence F0b is to be executed. Therefore (first branch N illustrated in FIG. 3), the virtual machine VM executes the original JavaCard™ implementation.

In step 3), if there is an associated alternate function F2, the virtual machine VM recovers said at least one argument Arg1 of said platform-independent first method F0 for use and modification by said alternate function F2. (illustrated RECOV(VM, Arg1, F0, F2)).

It is to be noted that when the platform-independent first method F0 has no argument Arg1, said step 3) is not performed. As this step is optional, it is illustrated in dotted lines.

As the alternate function F2 will be run instead of the virtual machine instructions of the operations sequence F0b of the platform-independent first method F0 (F0b which is run usually when the specific second method F1 returns a true value), it needs to be run with the arguments Arg1 of the platform-independent first method F0. Therefore, the virtual machine VM makes all the arguments Arg1 of the platform-independent first method F0 available for the alternate function F2.

In step 4), if there is a corresponding alternate function F2, said virtual machine VM recovers said at least one local variable Ve1 of said platform-independent first method F0 for use and modification by said alternate function F2 (illustrated RECOV(VM, Ve1, F0, F2)).

It is to be noted that when the platform-independent first method F0 has no local variable Ve1, said step 4) is not performed. As this step is optional, it is illustrated in dotted lines.

It is to be noted that for some virtual machines such as the Java™ Virtual Machine JVM, the virtual machine is based on a stack architecture, which means that instructions are executed on values read from a data stack and results are written to the same data stack.

A data stack STK1 is used for the execution of the platform-independent first method F0.

The man skilled in the art additionally recognizes the execution stack, also called call stack, XSTK1 which represents the execution of this program:

The execution stack XSTK1 is divided in a plurality of frames FR.

Each time a method is called, a new frame FR is created. Hence, a first frame FR0 is created for the platform-independent first method F0 and a second frame is created for the second method F1. Each time a method returns, the frame FR of that method invocation is suppressed.

An execution stack frame stores the data of the associated method: its local variables, the arguments (arguments also called parameters) with which it was invoked, the data stack pointer for use by the method and the localization (address pointer/reference pointer) at which the method is executing.

It is to be noted that the data stack pointer of a newly created frame may be initialized from the last value of the data stack pointer of previous frame or may be initialized in a completely independent way as an implementation choice of the JavaCard™ virtual machine.

When the alternate function F2 is platform-independent, a new frame FR2 is created.

When the alternate function F2 is native, another stack STK2 which is used for the native language, (which will be called native stack in the following), is used.

Hence, for said recovering, in a non-limitative example, the virtual machine VM will recover the argument(s) Arg1 and the local variable(s) Ve1 from the frame FR0 related to the platform-independent first method F0 being run and will push them on the frame FR2 or stack STK2 related to the alternate function F2. The argument(s) Arg1 and the local variable(s) Ve1 will be used and may be modified by said alternate function F2.

As the virtual machine VM manages all the different stacks STK and frames FR, it knows exactly where to find the argument(s) Arg1 and local variable(s) Ve1 and where to push them.

Hence, there is no creation of a dedicated arguments table, and of a dedicated local variable table for the alternate function F2, as this latter will be executed with the argument(s) of the first platform-independent F0.

In a non-limitative example, the recovery of arguments Arg1 and local variables Ve1 is performed via a recovery function provided by the virtual machine VM which is written in the C language and which is called by the function F2.

In another non limitative example, the recovery of arguments Arg1 and local variables Ve1 is a set of instructions written in the C language and included in the function F2 itself.

It is to be noted that when the alternate function F2 is platform-independent a new data stack pointer is initialized the same way it would be for any standard method call.

It is to be noted that these step 3 and 4 may be performed in parallel, or step 3 may be performed indifferently before or after step 4.

It is to be noted that when it has found the associated function F2 for the current platform-independent first method F0, if the alternate function F2 is native, the virtual machine VM informs the processor unit PR which native function F2 it has to execute.

In step 5), the processor unit PR or the virtual machine VM executes said alternate function F2 (step illustrated EXEC(F2(Arg1, Ve1))).

It is to be noted that the processor unit PR executes said alternate function F2 when it is a native function, and the native stack ST2 is called with the argument(s) Arg1 and with the local variable(s) Ve1 of the platform-independent first method F0.

The virtual machine VM executes said alternate function F2 when it is platform-independent, and the frame FR2 is created with the argument(s) Arg1 and with the local variable(s) Ve1 of the platform-independent first method F0.

If the argument(s) Arg1 and the local variable(s) Ve1 have been modified by the alternate function F2, upon completion of said alternate function F2 (i.e. on return), the virtual machine VM copies the new values from the current frame FR2 to the frame FR0 which is associated to the current platform-independent first method F0, and the frame FR1 is recalled as the current execution context.

Furthermore, upon completion of said alternate function F2, said specific second method F1 returns a false value. Said false value is pushed on the virtual machine stack STK1, and the frame FR0 is recalled as the current execution context.

This false value is utilized to instruct the virtual machine VM to skip the execution of the original operations sequence F0b. Therefore, the virtual machine VM avoids executing the operation sequence which is not anymore up-to-date regarding the market changes for said application APP and/or which is slower and/or.

In a step 6), upon completion of said alternate function F2, said virtual machine VM executes the second operations sequence F0c of said platform-independent first method F0 (step illustrated EXEC(VM, F0c)).

After the execution of the function F2, there is no direct exit from said platform-independent first method F0 so that the virtual machine instructions of the second operations sequence F0c which are written after the call of the specific second method F1 are executed.

The last operation (which is a return) of the second operations sequence F0c causes the virtual machine VM to exit said platform-independent first method F0.

Hence, a developed source code SC including a call to said specific second function F1 remains interoperable and will run normally on any integrated circuit card ICC as it includes a different implantation of said specific second function F1 according to the platform used. However, when loaded on an integrated circuit card ICC supporting a proprietary virtual machine VM (FIG. 1) which is adapted to perform the method MTH and to interpret the parameter TG1 of said specific second method F1, critical parts of the processing of the source code SC will be executed in an optimized and/or customized manner.

Thanks to the method MTH described (and in particular thanks to the parameter TG1 of the second method F1), there is no need to have a proprietary first package PK1 in said first memory MEM1 comprising specific native methods which are developed to optimize and/or customize the application APP. It is to be noted that contrary to the method MTH described, when such native methods are used, the application APP is not interoperable as there must be in all the different ICC cards delivered by different issuers said first package PK1 comprising said specific native methods, or even comprising the whole application, which hinders the ability to customize, and therefore to optimize or customize, some parts of, or all the application APP, after the product comprising said ICC card is issued.

In a non-limitative embodiment, the method MTH further comprises downloading said alternate function F2 in a memory MEM1, MEM2 of said integrated circuit card ICC, said download comprising:
- a first information 11 to identify the application APP where the platform-independent first method F0 is defined;
- a second information 12 to associate a parameter TG1 to a reference Ref1 corresponding to the alternate function F2;
- a third information 13 comprising the implementation (i.e. the code) of said alternate function F2 as a replacing operations sequence for said first operations sequence F0b.

It is to be noted that in a non-limitative embodiment, the download is performed by means of an APDU ("Application Protocol Data Unit") commands sequence sent by a terminal (not illustrated) to the ICC card.

It is to be noted that the download of said alternate function F2 is performed after the first class CLS0 has been downloaded, that is to say, the third package PK3 is downloaded in the integrated circuit card ICC after the second package PK2.

The download may be performed during the personalization phase of the ICC card or post-issuance.

Hence, as described before, the method MTH is carried out by an integrated circuit card ICC (illustrated in FIG. 1) comprising a virtual machine VM and a processor unit PR, a first non-volatile memory MEM1 and a second rewritable non-volatile memory MEM2, wherein said integrated circuit card ICC is adapted to modify the execution of a platform-independent first method F0 by means of said virtual machine VM, said platform-independent first method F0 comprising a first operations sequence F0b and a second operations sequence F0c.

Said virtual machine VM is adapted to:
- check if there is a call within said platform-independent first method F0 to a specific second method F1, said specific second method F1 comprising one parameter TG1;
- if there is such a call and if said specific second method F1 is not platform-independent, check according to said parameter TG1 if there is an alternate function F2 associated to said platform-independent first method F0 stored in a memory MEM1, MEM2 of said integrated circuit card ICC;
- if there is a corresponding alternate function F2:
- execute said alternate function F2, said alternate function F2 replacing said first operations sequence F0b;
- upon completion of said alternate function F2, execute the second operations sequence F0c of said platform-independent first method F0;
- otherwise, execute the first operations sequence F0b and the second operations sequence F0c of said platform-independent first method F0.

Said processor unit PR is adapted to execute said alternate function F2, said alternate function F2 replacing said first operations sequence F0b.

In a non-limitative embodiment, if said platform-independent first method F0 comprises at least one argument Arg1 and if there is an associated alternate function F2, said virtual machine VM is further adapted to recover said at least one argument Arg1 of said platform-independent first method F0 for use and modification by said alternate function F2.

In a non-limitative embodiment, if said platform-independent first method F0 comprises at least one local variable Ve1 and if there is an associated alternate function F2, said virtual machine VM is further adapted to recover said at least one local variable Ve1 of said platform-independent first method F0 for use and modification by said alternate function F2.

While downloading of the alternate function F2, in a non-limitative embodiment, said processor unit PR is further adapted to:
- identify the application APP where the platform-independent first method F0 is defined, according to the first information 11;
- update the associated table TAB with the associated reference Ref1 according to the second information 12; and
- store the alternate function F2 in a memory MEM1, MEM2 of said integrated circuit card ICC according to the third information 13.

It is to be understood that the present invention is not limited to the aforementioned embodiments and variations and modifications may be made without departing from the scope of the invention. In the respect, the following remarks are made.

Hence, the application APP may be any other application than a payment application.

In other non-limitative embodiments, the smart card is an Electronic Identity Card, a health card, a driving license, a passport, a privacy card, a financial service card, an access card etc.

Hence, the optimization is about the time execution in the non-limitative example of a payment transaction. Of course, in other embodiments, the optimization may concern a stack optimization or other kind of optimization.

Hence, virtual machines which are based on register architecture instead of stack architecture may be used.

Hence, other virtual machine such as the CLI virtual machine (Common Intermediate Language) may be used.

Hence, in another non-limitative embodiment, the checking of the alternate function F2 may be performed if said specific second method F1 is platform independent, that is to say written in the portable language JavaCard™ in a non-limitative example. In this case, within said specific second method F1, there will be a call to a third method which will be native or a proprietary bytecodes and which will comprise as an argument of the same value as the parameter TG1 of said specific second method F1. The virtual machine VM which supports the alternate function(s) F2 will interpret the argument of said third method and check the associated alternate function F2 as described before.

The embodiments are also intended to cover computers programmed to perform said steps of the above-described method.

One or a plurality of computer program products PG as illustrated in FIG. 1 can be contained in the ICC card. A computer program product PG comprises a set of instructions. Thus, said set of instructions contained, for example, in an ICC card memory, may cause the ICC card (an more particularly here the virtual machine VM) to carry out the different steps of the method MTH.

Hence, some embodiments of the invention may comprise one or a plurality of the following advantages:
- it is easy to implement;
- it allows easy customization of applications without impacting application's design (noticeably avoiding splitting its implementation in small methods, which would decrease performance);
- it brings a competitive advantage in term of customization, while keeping the application interoperable;
- when the alternate function F2 is implemented in native, it permits to bring a competitive advantage in term of performance (i.e. it runs slower on other platforms which don't support the alternate function F2), while keeping an application interoperable;
- it permits to test the performance of an application and to verify the operations which need to be optimized after the product comprising the ICC card is issued. Hence, it permits to modify applications post-issuance;
- there is no need to specify generic native methods in advance in the first memory MEM1 which would be a difficult task to achieve as one can't be sure before issuance of the product where does the weakness of an application reside in term of performance or what will be the evolution of such an application in the future;
- an application APP is not modified from an ICC card to another ICC card delivered by different issuers. Only one or a plurality alternate function(s) F2 are added (and a corresponding parameter TG1) according to the specific ICC card issuer's who is aware of the possibility to modify (for optimization/customization) the ICC card post-issuance;
- there is no need to deploy native methods all over different platforms to enable an application to run on these platforms, as there is no direct invocation of native method in the first platform-independent method: there is no need to modify the second package PK2 comprising the application APP where F0 is defined. We only need to modify the first package PK1 comprising F1 according to the targeted platform (generic or proprietary);
- it replaces proprietary OS patching mechanism, which usually works at method level and usually focuses on customization rather than performance.

The invention claimed is:

1. A method for modifying the execution of a platform-independent first method of an application within an integrated circuit card, said integrated circuit card comprising a first nonvolatile memory, a second rewritable non-volatile memory, a virtual machine and a processor unit, wherein said platform-independent first method comprises a first operations sequence and a second operations sequence, and wherein said method is carried out by execution of program instructions coupled within a computer configured to implement the method, the execution comprising:
- checking by means of said virtual machine if there is a call within said platform-independent first method to a specific second method, wherein said specific second method, stored in a memory of said integrated circuit card, comprises one parameter;
- if there is such a call, executing by means of said processor unit or said virtual machine said specific second method; the execution thereof comprising
- said processor unit or said virtual machine checking if there is an alternate function associated to said platform-independent first method, said alternate function being stored in a memory of said integrated circuit card; said processor unit or said virtual machine using said parameter to locate the alternate function within said integrated circuit card memory; and
- if there is an associated alternate function:
  - executing by means of said processor unit or by means of said virtual machine said alternate function, said alternate function replacing said first operations sequence; and
  - upon completion of said alternate function, skipping said first operations sequence and executing by means of said virtual machine the second operations sequence of said platform-independent first method.

2. The method according to claim 1, wherein if there is no call to said specific second method, said virtual machine executing the first operations sequence and the second operations sequence of said platform-independent first method.

3. The method according to claim 1, wherein said platform-independent first method comprises at least one argument and wherein said method further comprises:
if there is an associated alternate function, recovering by means of said virtual machine said at least one argument of said platform-independent first method for use and modification by said alternate function.

4. The method according to claim 1, wherein said platform-independent first method comprises at least one local variable and wherein said method further comprises:
if there is an associated alternate function, recovering by means of said virtual machine said at least one local variable of said platform-independent first method for use and modification by said alternate function.

5. The method according to claim 1, wherein said alternate function is a platform-independent function or a native function.

6. The method according to claim 1, wherein said specific second method is a platform-independent method or a native method or is a set of specific instructions of said virtual machine.

7. The method according to claim 6, wherein said specific second method is comprised in a first package, said platform-independent first method is comprised in a second package, and said alternate function is comprised in a third package, all the three packages being different from each other.

8. The method according to claim 1, wherein said specific second method returns a Boolean type, and wherein:
upon completion of said alternate function, said specific second method returns a false value;
when there is no alternate function associated to said platform-independent first method corresponding to said parameter, said specific second method returns a true value;
when said specific second method is platform-independent, said specific second method returns a true value.

9. The method according to claim 1, wherein said second non-volatile memory comprises at least one table, said at least one table comprising an associated reference of said alternate function indicating where said alternate function associated to said platform-independent first method is stored in memory within said integrated circuit card.

10. The method according to claim 1, wherein said virtual machine is a Java™ virtual machine.

11. The method according to claim 1, wherein said integrated circuit card is a secure element.

12. The method according to claim 1, wherein said method further comprises downloading said alternate function in a memory of said integrated circuit card, said download comprising:
a first information to identify said application where the platform-independent first method is defined;
a second information to associate a parameter to a reference corresponding to the alternate function;
a third information comprising the implementation of said alternate function as a replacing operations sequence for said first operations sequence.

13. An integrated circuit card comprising a virtual machine, a processor unit, a first non-volatile memory and a second rewritable non-volatile memory, wherein said integrated circuit card is adapted to modify the execution of a platform-independent first method of an application within said integrated circuit card, said platform-independent first method comprises a first operations sequence and a second operations sequence, and wherein:
said virtual machine is adapted to check if there is a call within said platform-independent first method to a specific second method, said specific second method, stored in a memory of said integrated circuit card, comprises one parameter;
if there is such a call, said processor unit or said virtual machine executes said specific second method;
said processor unit or said virtual machine checking if there is an alternate function associated to said platform-independent first method, said alternate function being stored in a memory of said integrated circuit card; said processor unit or said virtual machine using said parameter to locate the alternate function within said integrated circuit card memory; and
if there is an associated alternate function:
executing by means of said processor unit or by means of said virtual machine said alternate function, said alternate function replacing said first operations sequence; and
upon completion of said alternate function, skipping said first operations sequence and executing by means of said virtual machine the second operations sequence of said platform-independent first method.

14. The integrated circuit card according to claim 13, wherein if there is no call to said specific second method, said virtual machine executing the first operations sequence and the second operations sequence of said platform-independent first method.

15. The integrated circuit card according to claim 13, wherein said integrated circuit card comprises:
a first package comprising said second specific method (F1);
a second package comprising said platform-independent first method; and
a third package comprising said alternate function, said first, second and third packages being different from each other.

* * * * *